United States Patent
Laing et al.

(10) Patent No.: US 7,476,312 B2
(45) Date of Patent: Jan. 13, 2009

(54) FLUID TREATMENT SYSTEM

(75) Inventors: G. Bruce Laing, London (CA); Daniel K. Engelbreth, Thamesford (CA); Julian C. Giggs, St. Catharines (CA); F. Mark Hutchinson, Woodstock (CA); Brent W. Matthews, London (CA)

(73) Assignee: Trojan Technologies Inc. (CA)

( * ) Notice: Subject to any disclaimer, the term of this patent is extended or adjusted under 35 U.S.C. 154(b) by 413 days.

(21) Appl. No.: 11/106,711

(22) Filed: Apr. 15, 2005

(65) Prior Publication Data

US 2005/0247609 A1 Nov. 10, 2005

Related U.S. Application Data

(60) Provisional application No. 60/562,233, filed on Apr. 15, 2004.

(51) Int. Cl.
 B01D 29/88 (2006.01)
 C02F 9/12 (2006.01)
 C02F 1/00 (2006.01)
 C02F 9/00 (2006.01)

(52) U.S. Cl. .................. 210/109; 210/259; 210/192; 210/257.1

(58) Field of Classification Search .................. 210/652, 210/455, 419, 416.3, 347, 330, 328, 321, 210/243, 282, 323.2, 134, 195.1, 258, 97, 210/85

See application file for complete search history.

(56) References Cited

U.S. PATENT DOCUMENTS 4,880,535 A * 11/1989 Burrows ..................... 210/181
5,290,442 A * 3/1994 Clack ..................... 210/257.1
6,099,735 A * 8/2000 Kelada ..................... 210/652

FOREIGN PATENT DOCUMENTS

| CA | 2160255 A1 | 11/1994 |
| CA | 2200708 A1 | 3/1996 |
| CA | 2201706 A1 | 2/1997 |
| CA | 2457562 A1 | 2/2003 |
| EP | 616 975 A1 | 9/1994 |
| JP | 10-109090 A | 4/1998 |
| WO | 96/01790 A1 | 1/1996 |

OTHER PUBLICATIONS

International search report for International Application No. PCT/CA2005/000561, published Oct. 27, 2005.

* cited by examiner

*Primary Examiner*—Krishnan S. Menon
*Assistant Examiner*—Madeline Gonzalez
(74) *Attorney, Agent, or Firm*—Katten Muchin Rosenman LLP

(57) ABSTRACT

There is disclosed a water treatment appliance, particularly for on-the-counter treatment of potable water. The appliance comprises: a base unit comprising a pump, a housing and a cooling unit for chilling water in the housing; a removable water reservoir engageable with the housing; a control panel comprising a water dispensing switch; an outlet for dispensing treated water from the fluid treatment system; and a treatment cartridge removably disposed in the housing. The treatment cartridge comprises a first chamber and a second chamber in communication with one another. The first chamber is in communication with the housing and has disposed therein a filter element. The second chamber is in communication with the outlet and has disposed therein an ultraviolet radiation lamp.

44 Claims, 3 Drawing Sheets

FLUID TREATMENT SYSTEM

CROSS-REFERENCE TO RELATED APPLICATION

The present application claims the benefit under 35 U.S.C. §119(e) of provisional patent application Ser. No. 60/562,233, filed Apr. 15, 2004, the contents of which are hereby incorporated by reference.

BACKGROUND OF THE INVENTION

1. Field of the Invention

In one of its aspects, the present invention relates to a fluid treatment system, more particularly, an integrated system that treats water by filtration and by exposure to radiation, preferably ultraviolet radiation. In another of its aspects, the present invention relates to a method for treating a fluid, more particularly a method for irradiating water.

2. Description of the Prior Art

Fluid treatment systems are generally known in the art. More particularly, ultraviolet (UV) radiation fluid treatment systems are generally known in the art. Many of the known radiation treatment systems have been designed for treatment of large volumes of fluid (typically wastewater) on a commercial scale. Thus, many of these known fluid treatment systems have been implemented in municipal wastewater treatment plants (i.e., treatment of water that is discharged to a river, pond, lake or other such receiving stream), municipal drinking water treatment plants, industrial wastewater treatment plants and the like.

For examples of fluid treatment system that have been applied in municipal wastewater treatment plants, see U.S. Pat. Nos. 4,482,809, 4,872,980, 5,006,244, 5,418,370, 5,539,210 and Re 36,896 (all in the name of Maarschalkerweerd and all assigned to the assignee of the present invention) which describe gravity fed fluid treatment systems which employ ultraviolet (UV) radiation.

In the field of municipal drinking water, it is known to utilize so-called "closed" fluid treatment systems or "pressurized" fluid treatment systems. Closed fluid treatment devices are known—see, for example, U.S. Pat. No. 5,471,063 (in the name of Hayes et al. and assigned to the assignee of the present invention) and U.S. Pat. No. 5,504,335 (in the name of Maarschalkerweerd and assigned to the assignee of the present invention). See also U.S. Pat. No. 6,500,346 [Taghipour et al. (Taghipour) and assigned to the assignee of the present invention].

In recent years, notwithstanding the significant advances made in fluid disinfection technology useful for treating municipal waste water and municipal drinking water, there has been an increasing need to improve the quality of water used on a domestic basis. This is led to a boom in the bottled water industry.

In other words, even though government agencies have implemented stringent guidelines for treatment of water in municipal drinking water plants thereby improving the quality of water delivered to domiciles, the heightened awareness of having "purified" drinking water for domestic use has at least been responsible for the boom in the bottled water industry. Reliance on bottled water for drinking is fraught with a number of disadvantages, including:

- on a volume basis, bottled water is very expensive (typically, in many countries, the cost of bottled water exceeds the cost of fuel used to power automobiles);
- it is inconvenient to obtain (i.e., the user must purchase the bottled water in a desired volume, transport the volume to the domicile, etc);
- it requires adequate storage space in the domicile; and
- it creates an environmental issue in that empty bottles must be discarded after use.

An alternative to using bottled water is to utilize filter units available from retail outlets. Non-limiting examples of such filtered units include the Brita™ system, the Moen™ filter system and the like. Typically, these filter systems may involve a cartridge element which is placed in a pitcher or other container for water or they are fixed to a faucet. Unfortunately, while these filter systems are useful to remove particulates and, in some cases, "taste" and/or "odour" from the water being treated, they are unable to remove many micro organisms. In addition, some filter systems are disadvantageous since the filter media itself is susceptible to collection, growth and/or release of the very microorganisms which are removed from the water.

Another approach which has been used domestically is a radiation treatment system which can be obtained from a retail outlet and installed under a kitchen counter or elsewhere in the domicile. Such systems are particularly useful in disinfecting or otherwise inactivating microorganisms in the water. Unfortunately, these systems do not remove particulate matter and other non-living contaminants that may be present in the water.

Thus, there remains a need in the art for a relatively small scale water treatment system which can receive municipal drinking water and treat that water to remove (or at least reduce to a low level) contaminants that may be present in the drinking water—e.g., microorganisms, particulate material, non-living contaminants (e.g., organic compounds, oxidants and the like). It would be particularly useful to have such a device sized and styled in a matter that can be used as an "on-the-counter" appliance in a domicile. In addition, it would particularly beneficial if such a system were relatively low maintenance, easy to install and easy to use.

SUMMARY OF THE INVENTION

It is an object of the present invention to provide a novel fluid treatment system which obviates or mitigates at least one of the above-mentioned disadvantages of the prior art.

In one of its aspects, the present inventions provides a fluid treatment system comprising:

a removable reservoir for receiving a fluid;

a treatment zone in fluid communication with the removable reservoir;

a fluid filter element disposed in the treatment zone;

a radiation source disposed in the treatment zone; and a system outlet for dispensing treated fluid from the treatment zone.

In another of its aspects, the present invention provides a water treatment appliance comprising:

a base unit comprising a pump, a housing and a cooling unit for chilling water in the housing;

a removable water reservoir engageable with the housing;

a control panel comprising a water dispensing switch;

an outlet for dispensing treated water from the fluid treatment system; and a treatment cartridge removably disposed in the housing; the treatment cartridge comprising a first chamber and a second chamber in communication with one another, the first chamber in communication with the housing and having disposed therein a filter element and the second chamber in communication with the outlet and having disposed therein an ultraviolet radiation lamp.

In yet another of its aspects, the present invention provides a treatment cartridge for use in a fluid treatment system, the treatment cartridge comprising a first chamber and a second chamber in fluid communication with one another, the first chamber comprising a fluid inlet for entry of fluid into the cartridge and the second chamber comprising a fluid outlet for exit of fluid from the cartridge, one of the first chamber and the second chamber having disposed therein a filter element and the other of the first chamber and the second chamber having disposed therein a radiation source.

As used throughout this specification, the term "fluid" is intended to have a broad meaning and encompasses liquids and gases. The preferred fluid for treatment with the present system is a liquid, preferably water (e.g., potable water and the like).

Those with skill in the art will recognize that there is reference throughout the specification to the use of seals and the like to provide a practical fluid seal between adjacent elements in the fluid treatment system. For example, those of skill in the art will recognize that it is well known in the art to use combinations of coupling nuts, O-rings, bushings, check-valves and like to provide a substantially fluid tight seal between abutting elements of the system.

BRIEF DESCRIPTION OF THE DRAWINGS

Embodiments of the present invention will be described with reference to the accompanying drawings, wherein like numerals designate like elements, and in which.

DETAILED DESCRIPTION OF THE PREFERRED EMBODIMENTS

Figure 1:
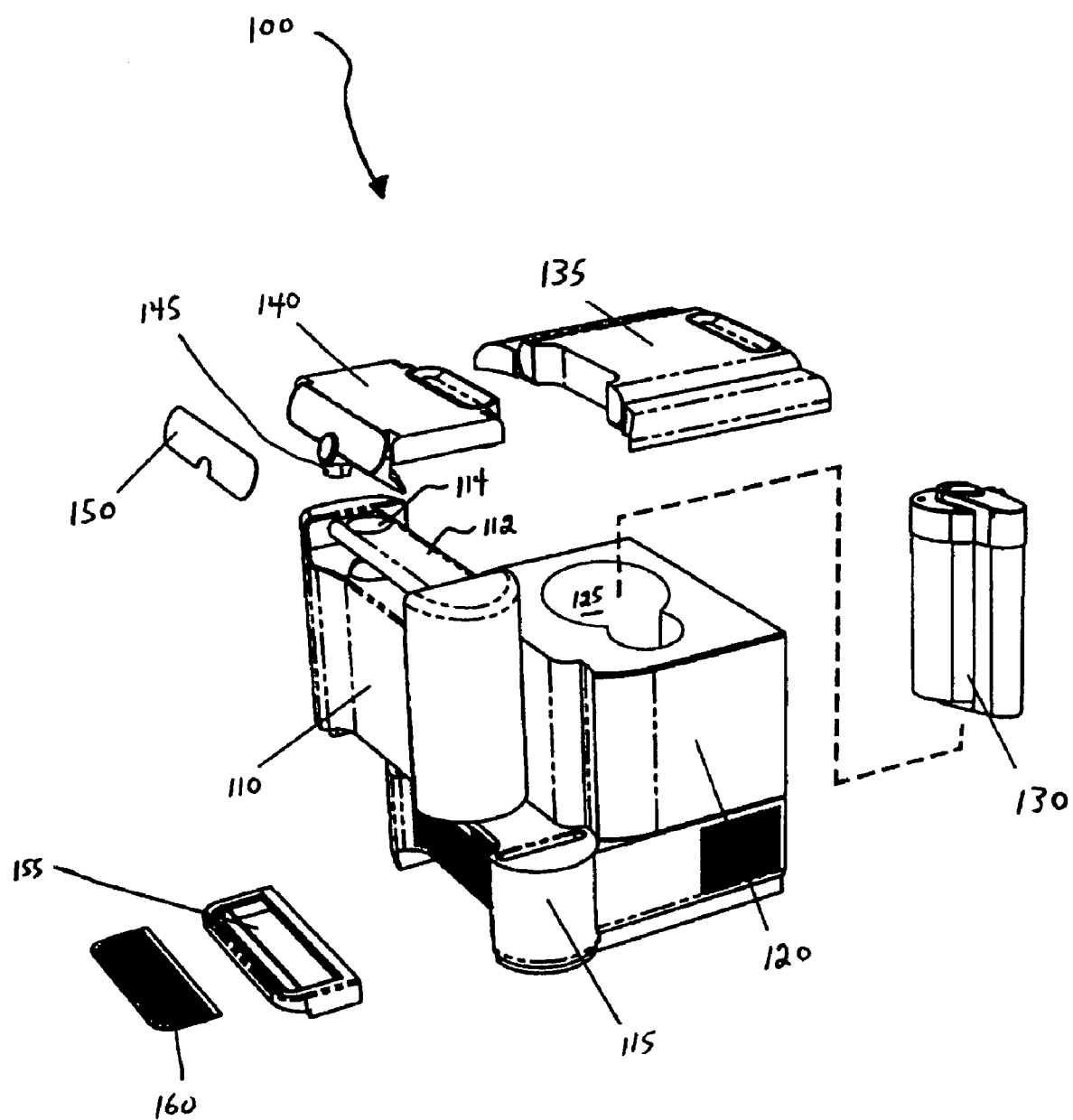
FIG. 1 illustrates a perspective view of a preferred embodiment of the present fluid treatment system.

With reference to FIG. 1 there is illustrated a perspective view of a fluid treatment system 100 in accordance with a preferred embodiment of the present invention.

Fluid treatment system 100 comprises a removable reservoir 110 that is removably engageable with respect to a base unit 115. Disposed on base unit 115 is a housing 120. Removable reservoir 110 and housing 120 are in fluid communication using appropriate valves, seals and the like (not shown for clarity).

Housing 120 comprising an opening 125 for receiving a removable cartridge 130. Removable cartridge 130 will be discussed in more detail below.

Disposed on housing 120 is a removable lid 135 which can be removed from housing 120 to access removable cartridge 130.

Fluid treatment system 100 further comprises a control panel 140 that includes a dispensing spigot (or spout) 145. Disposed on control panel 140 is a switch 150 (e.g., a membrane switch or any other type of switch) for actuating fluid treatment system 100.

Disposed below removable reservoir 110 is a drip tray 155 that includes a removable grill 160.

Preferably, control panel 140 comprises the appropriate circuitry which will notify a user in one or more of the following situations:

indicate the power in ON or in IDLE mode;
signal to indicate the UV lamp is gaining intensity;
a low reservoir water indicator to show when to add water;
a feature to select the quantity of water to be dispensed;
when system 100 is "processing" the water;
when it is time to replace the filter unit and/or the UV lamp in removable cartridge 130; and
when one or both of the filter unit and the UV lamp in the removable cartridge is completely used and system 100 will not process water.

The circuitry and components to achieve these functions is within the purview of a person of skill in the art and will not be discussed in detail herein.

Figure 2:
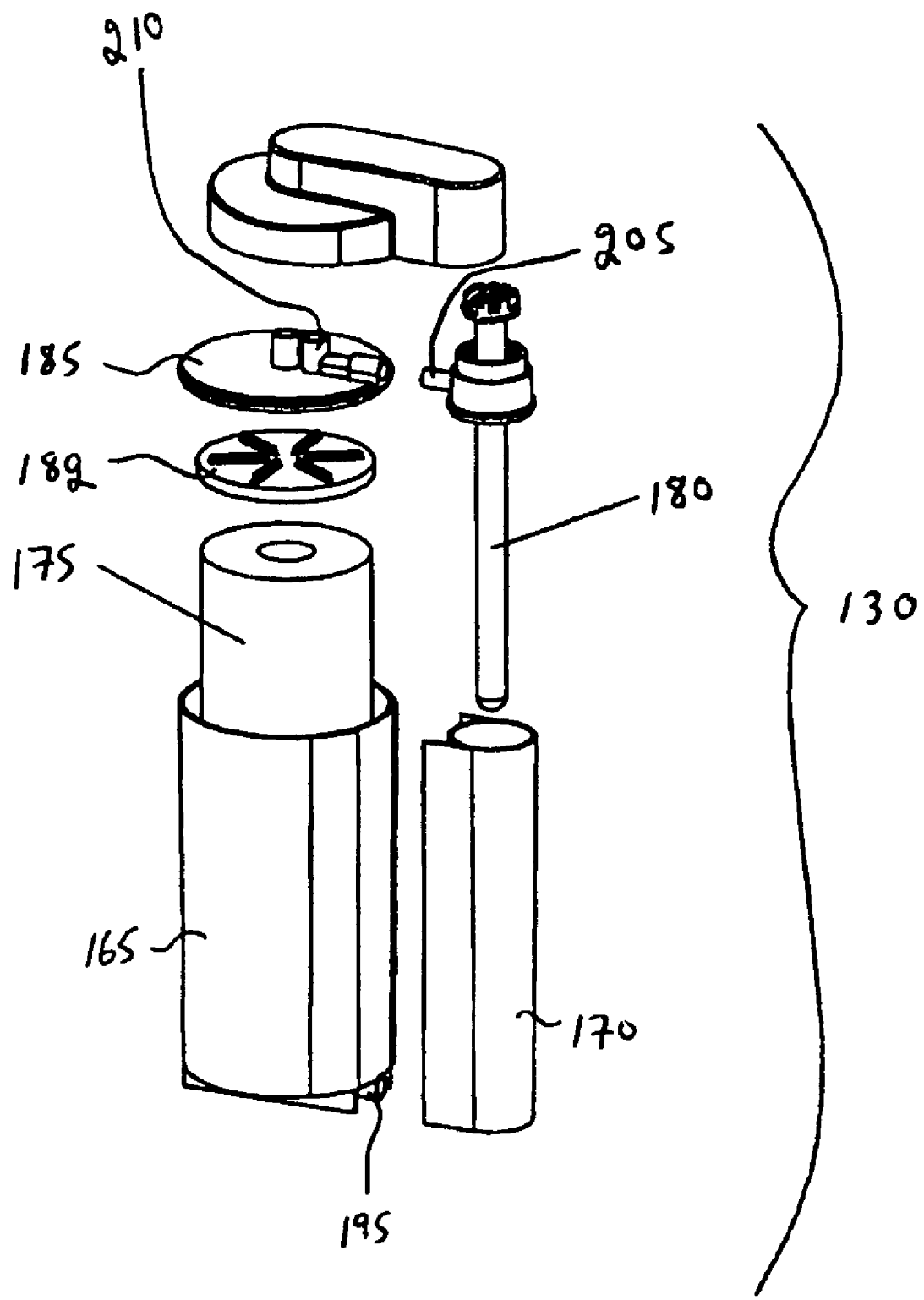
FIG. 2 illustrates an exploded view a portion of the fluid treatment system illustrated in FIG. 1.
Figure 3:
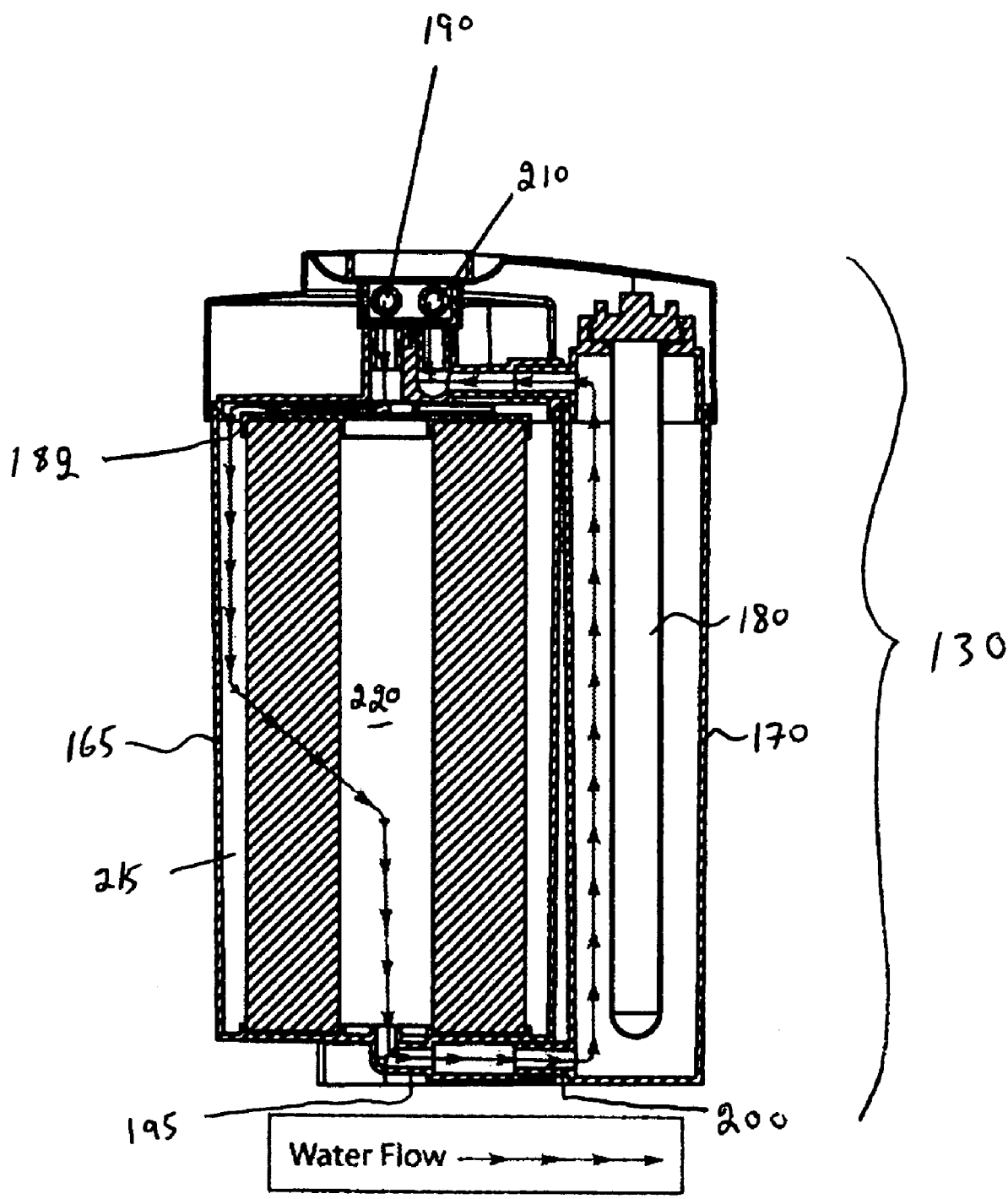
FIG. 3 illustrates a sectional view of the element of the fluid treatment system illustrated in FIG. 2.

With particular reference to FIGS. 2-3, removable cartridge 130 comprises a first chamber 165 and a second chamber 170. Disposed in first chamber 165 is an annular filter element 175. Disposed in second chamber 170 is ultraviolet radiation lamp 180. A lid 182 is placed atop filter element 175. Of course it is possible to utilize a single lid (not shown) to cover both first chamber 165 and second chamber 170.

An integrated lid 185 is secured to first chamber 165. Lid 185 comprises an inlet 190 for receiving water from removable reservoir 110. First chamber 165 comprises an outlet 195 in fluid communication with an inlet 200 of second chamber 170. Second chamber 170 further comprises an outlet 205 in fluid communication with an outlet 210 disposed on lid 185. Outlet 210 is in fluid communication with dispensing spigot 145.

As can be seen, particularly with reference to FIG. 3, the arrangement of filter element 175 in first housing 165 defines an annular outer chamber 215 and an axial inner chamber 220. As shown, inlet 190 is in fluid communication with outer chamber 215 and inner chamber 220 is in fluid communication with outlet 195.

As is further apparent in FIGS. 2 and 3, removable cartridge 130 integrates the filter and radiation elements of the present fluid treatment system as a single replaceable unit or as a pair of elements which may be individually replaced. Preferably, removable cartridge 130 is shaped to have a unique fitting arrangement with opening 125 in housing 120.

When it is desired to treat water, removable reservoir 110 is removed from base unit 115, for example, by using handle 112. Water (e.g., tap water) is then dispensed to the removable reservoir 110 through inlet 114 in removable reservoir 110. Once removable reservoir 110 has been filled, it is returned to base unit 115.

Next, switch 150 on control panel 140 is depressed thereby starting the system. Preferably, control panel 140 contains appropriate circuitry to implement a prescribed delay (e.g., 10 seconds) to "preheat" ultraviolet radiation lamp 180. After the warm-up period, a pump (not shown for clarity) disposed in base unit 115 is actuated and serves to withdraw water from removable reservoir 110 and feed it to inlet 190 of removable cartridge 130. Next, under pressure from the pump (not shown) the water is fed from inlet 190 to outer chamber 215. The pump creates sufficient pressure to force the water through filter element 175 such that it passes from annular outer chamber 215 to axial inner chamber 220 and on to outlet 195.

Next, the water enters inlet 200 of second chamber 170 and passes through second chamber 170 and is exposed to ultraviolet radiation. After exposure to ultraviolet radiation, the water passes through outlet 205 of second chamber 170 and ultimately to spout 145 wherein it can be collected and used appropriately.

FIG. 3 is particularly helpful in illustrating the flow of water through removable cartridge 130.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to modify housing 120 to contain a second reservoir. In one embodiment, such a second reservoir could receive fluid from a version of removable cartridge 130 that has been modified to include an inlet/outlet (separate or integral) in fluid communication with the second reservoir (for example, the inlet/outlet could be interposed between outlet 195 of first chamber 165 and inlet 200 of second chamber 170). Alternatively, such a second reservoir could be configured such that fluid is fed from the second reservoir to inlet 190 of removable cartridge 130. In either of these modified embodiments, it is possible (in some case, preferred) to incorporate in housing 120 a chilling unit for chilling fluid contained in the second reservoir. It is also possible to modify housing 120 to have the second reservoir of chilled fluid surrounding or substantially encasing removable cartridge 130. This results in cooling of fluid in removable cartridge 130. Alternatively, it is possible simply to couple removable cartridge 130 with a chiller (i.e., not necessarily via the second reservoir described above). Also, it is possible to incorporate a control element such as an integrated circuit (e.g., a chip) in the present system, preferably mounted on removable cartridge 130, for recording fluid flow through the system.

Another modification of the illustrated embodiments of the invention relates to incorporation of a secondary reservoir between base unit 115 that contains the pump (not shown) and inlet 190 of removable cartridge 130. In this embodiment the secondary reservoir can contain the chiller unit and thus provide chilled water to the carbon filter which will have the effect of reducing the growth of micro-organisms on the filter surface, thus increasing the life of the filter.

Yet another modification of this arrangement relates to incorporation of a 2 way solenoid valve in a "T" flow diverter locate between second chamber 170 and outlet 210, and with the addition of a line from the "T" flow diverter to the secondary reservoir (not shown), it will be possible for the system to be put into a re-circulation mode. Such re-circulation will be advantageous particularly where a 185 nm UV lamp is used, as this will allow for the production of hydroxyl and peroxide oxidants that will provide for further water treatment and the control of bio-film production on the surfaces of the treatment system. The re-circulation mode can be intermittent or continuous and can be interrupted when the water is being dispensed. To deliver chilled water when the re-circulation is non-continuous, the pump can be activated when switch 150 on control panel 140 is depressed, then there can be a sufficient delay to allow for the UV lamp to reach an optimal output and for the pump to displace the water in chamber 165 and chamber 170 with chilled water.

In yet another modification, it is possible to line housing 120 with an insulation material such as a polyfoam body to insulate chilled (or heated) water contained therein.

In yet another modification, a flash hot water heater (or similar device) may be interposed between ultraviolet lamp radiation lamp 180 treatment zone and outlet 210.

It is therefore contemplated that the appended claims will cover any such modifications or alternate embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:
   a removable reservoir for receiving a fluid;
   a treatment zone in fluid communication with the removable reservoir;
   a fluid filter element disposed in the treatment zone, wherein the fluid filter element is disposed in a first chamber;
   a radiation source disposed in the treatment zone, the radiation source being disposed in a second chamber;
   a system outlet for dispensing treated fluid from the treatment zone; and
   a housing in which the first chamber and the second chamber are disposed, the housing being in fluid communication with the removable reservoir, the housing comprising a second reservoir for holding fluid, the second reservoir being configured to substantially encompass the fluid treatment zone.

2. The fluid treatment system defined in claim 1, wherein the removable reservoir comprises a reservoir inlet for admission fluid into the reservoir.

3. The fluid treatment system defined in claim 1, wherein the removable reservoir comprises a reservoir outlet for exit of fluid from the removable reservoir.

4. The fluid treatment system defined in claim 1, wherein the treatment zone comprises a treatment zone inlet for admission of fluid from the removable reservoir.

5. The fluid treatment system defined in claim 1, wherein the treatment zone comprises a treatment zone outlet for exit of fluid from the treatment zone.

6. The fluid treatment system defined in claim 1, wherein the filter element comprises particulate carbon, preferably a carbon block filter.

7. The fluid treatment system defined in claim 1, wherein the filter element comprises a membrane material, preferably a reverse osmosis membrane material.

8. The fluid treatment system defined in claim 1, wherein the filter element comprises a ceramic material.

9. The fluid treatment system defined in claim 1, wherein the filter element is elongate.

10. The fluid treatment system defined in claim 1, wherein the filter element is annular.

11. The fluid treatment system defined in claim 1, wherein the filter element is elongate and annular.

12. The fluid treatment system defined in claim 1, wherein the fluid filter element is disposed in a first chamber.

13. The fluid treatment system defined in claim 1, wherein the radiation source is disposed in a second chamber.

14. The fluid treatment system defined in claim 1, wherein the first chamber and the second chamber are in fluid communication.

15. The fluid treatment system defined in claim 1, wherein the first chamber and the second chamber are releasably engageable.

16. The fluid treatment system defined in claim 1, wherein the first chamber comprises a first chamber inlet in fluid communication with the treatment zone inlet.

17. The fluid treatment system defined in claim 1, wherein the first chamber comprises a first chamber outlet in fluid communication with a second chamber inlet in the second chamber.

18. The fluid treatment system defined in claim 1, wherein the second chamber comprises a second chamber outlet in fluid communication with the system outlet.

19. The fluid treatment system defined in claim 1, wherein:
(i) the first chamber comprises a first chamber inlet in fluid communication with the treatment zone inlet and a first chamber outlet in fluid communication with a second chamber inlet in the second chamber; and (ii) the second chamber comprises a second chamber outlet in fluid communication with the system outlet.

20. The fluid treatment system defined in claim 19, wherein the fluid filter element is elongate and annular, and is disposed in the first chamber to define an annular outer chamber and an axial inner chamber.

21. The fluid treatment system defined in claim 20, wherein the first chamber inlet is in fluid communication with the annular outer chamber.

22. The fluid treatment system defined in claim 20, wherein the first chamber outlet is in fluid communication with the axial inner chamber.

23. The fluid treatment system defined in claim 20, wherein the first chamber inlet is in fluid communication with the annular outer chamber and the first chamber outlet is in fluid communication with the axial inner chamber.

24. The fluid treatment system defined in claim 1, wherein the radiation source is elongate.

25. The fluid treatment system defined in claim 1, wherein the radiation source comprises an ultraviolet radiation source.

26. The fluid treatment system defined in claim 25, wherein the housing further comprises a cooling element for cooling fluid contained in the housing.

27. The fluid treatment system defined in claim 1, further comprising a pump to convey fluid from the removable reservoir to the fluid treatment zone and beyond.

28. The fluid treatment system defined in claim 1, further comprising a control element for controlling operation of the system.

29. The fluid treatment system defined in claim 28, wherein the control element comprises a fluid volume measurement element for measuring a volume of fluid passing through the fluid treatment zone.

30. The fluid treatment system defined in claim 29, wherein the control element comprises a fluid volume first signal element that is actuated when the volume of fluid passing through the fluid treatment zone exceeds a pre-determined volume.

31. The fluid treatment system defined in claim 28, wherein the control element comprises a fluid dispensing switch for dispensing fluid from the system.

32. The fluid treatment system defined in claim 31, wherein the fluid dispensing switch actuates a radiation source warm-up period during which the radiation source is powered for a period of time prior to dispensation of fluid from the system outlet.

33. The fluid treatment system defined in claim 32, further comprising fluid circulation means for recirculation of fluid during the warm-up period.

34. The fluid treatment system defined in claim 32, wherein the control element comprises a bypass element for bypassing the radiation source warm-up period if the radiation source is powered when the fluid dispensing switch is actuated.

35. The fluid treatment system defined in claim 28, wherein the control element comprises a fluid volume second signal element that is actuated when a volume of fluid in the removable reservoir is less than a predetermined volume.

36. The fluid treatment system defined in claim 28, wherein the control element comprises a radiation source signal that is actuated when the radiation source has been powered for a period of time greater than a predetermined period of time.

37. The fluid treatment system defined in claim 28, wherein the control element comprises an integrated circuit.

38. The fluid treatment system defined in claim 1, wherein the second reservoir comprises an inlet in fluid communication with the removable reservoir and an outlet in fluid communication with the treatment zone.

39. The fluid treatment system defined in claim 1, wherein the second reservoir comprises an inlet in fluid communication with an outlet of the treatment zone and an outlet in fluid communication with the system outlet.

40. The fluid treatment system defined in claim 1, further comprising a valve configured to cause fluid circulation within the fluid treatment system.

41. The fluid treatment system defined in claim 40, wherein the valve is operable in: (i) a first position to cause circulation of fluid through the second reservoir and the treatment zone, and (ii) a second position to cause fluid to be fed to the system outlet.

42. The fluid treatment system defined in claim 1, wherein the second reservoir comprises a cooling element for cooling fluid contained in the second reservoir.

43. A process for treating a fluid comprising treating the fluid in the fluid treatment system defined in claim 1.

44. A fluid treatment system comprising:
- a removable reservoir for receiving a fluid;
- a treatment zone in fluid communication with the removable reservoir;
- a fluid filter element disposed in the treatment zone, wherein the fluid filter element is disposed in a first chamber;
- a radiation source disposed in the treatment zone, the radiation source being disposed in a second chamber;
- a system outlet for dispensing treated fluid from the treatment zone; and
- a housing in which the first chamber and the second chamber are disposed, the housing being in fluid communication with the removable reservoir, the housing comprising a second reservoir for holding fluid, the second reservoir comprising a cooling element for cooling fluid contained in the second reservoir, and wherein the second reservoir is configured to substantially surround the fluid treatment zone such that fluid contained in the fluid treatment zone is cooled.

* * * * *